United States Patent [19]

Fenoglio

[11] 4,411,920
[45] Oct. 25, 1983

[54] PROCESS FOR BAKING PIES

[76] Inventor: Bernard F. Fenoglio, 55 Evelyn Ter., South Amboy, N.J. 08879

[21] Appl. No.: 295,663

[22] Filed: Aug. 24, 1981

Related U.S. Application Data

[63] Continuation-in-part of Ser. No. 128,680, Mar. 10, 1980, Pat. No. 4,305,329.

[51] Int. Cl.³ .................. G01N 33/02; A23L 1/10
[52] U.S. Cl. .................. 426/233; 426/418; 426/496; 426/497; 426/523
[58] Field of Search .......... 426/418, 523, 231, 296, 426/510, 511, 233, 94, 496, 497; 99/474, 339, 468; 126/41 A; 432/142

[56] References Cited

U.S. PATENT DOCUMENTS

| 2,372,362 | 3/1945 | Dawson | 126/41 A |
| 3,425,364 | 2/1969 | Martin | 432/142 |
| 3,518,949 | 7/1970 | Stock | 99/468 |
| 3,604,338 | 9/1971 | Fiedler | 99/339 |
| 3,782,892 | 1/1974 | Johnson et al. | 432/142 |
| 3,955,007 | 5/1976 | Roderick | 426/418 |
| 4,023,476 | 5/1977 | Burgess, Jr. | 99/468 |
| 4,058,635 | 11/1977 | Durth | 426/510 |

FOREIGN PATENT DOCUMENTS 599756  5/1978  Switzerland ............ 426/94

Primary Examiner—Raymond N. Jones
Assistant Examiner—George C. Yeung
Attorney, Agent, or Firm—Alice L. Chen

[57] ABSTRACT

A process for baking food such as pizza pies for fast food operations comprises prebaking fresh pies to a predetermined time in a baking chamber, storing the prebaked pies in a holding chamber under a controlled temperature and humidity, which humidity being controlled by steam injection and finally baking the stored pies to completion at the peak demand. Said prebaking and final baking can be carried out by placing pies on a turntable of a turntable oven to travel for a fraction of a turn for prebaking and for the remainder of the turn for final baking.

12 Claims, 5 Drawing Figures

PROCESS FOR BAKING PIES

BACKGROUND OF THE INVENTION

This application is a continuation in part of U.S. Application Ser. No. 128,680, filed on Mar. 10, 1980 now issued as U.S. Pat. No. 4,305,329.

This invention relates to a baking method, and more particularly to an improved process for baking pizza pies for quick serving in a fast food restaurant.

In general, pies are baked in one operation, i.e., to bake fresh pies till they are done. The backing is done in conventional, stationary, rotary, reel ('Ferris Wheel'-like) and conveyor ovens. The stationary deck oven provides the best baking conditions and complete flexibility but relies entirely on the skill, experience, and full attention of the operator to control the cooking time for each pie in the oven. Both rotary and reel ovens rotate many times during the required cooking period and require the same skill, experience, and attention from the operator as the stationary oven. The conveyor oven provides a preset constant baking time in that the pies are baked on the conveyor through a covered fired oven and are fully baked at the receiving end. Therefore, it overcomes the principal disadvantage of constant attention by the cook as in the stationary and rotary deck oven. However, the capacity for cooking is limited. Establishments currently using these ovens produce pies in approximately ten to twenty minutes. None of the above mentioned methods can produce fully cooked pies rapidly at times of peak demand. As it is well known, cooked pies cannot be kept warm long without loss of moisture. Although, frozen pies can be used to meet the peak demand but rebaking such frozen pies for restaurant use is neither feasible nor economical. As a result, there is a need to invert an improved baking process. The objective of this invention is to provide a unique process for fast baking which consists of step-wise baking to provide pies at peak demand without sacrificing the pie quality. Another objective of this invention is to provide a process for baking which requires a minimum of supervision and skill.

SUMMARY OF THE INVENTION

This invention relates to a new process for cooking pies which comprises precooking fresh pies in a baking chamber at preset temperature and time, storing the precooked pies in a holding chamber at controlled temperature and humidity wherein the humidity is regulated by instant steam injection and final cooking the precooked pies at preselected temperature to completion in the baking chamber.

In accordance with a preferred embodiment of the present invention, the improved baking process is carried out in a turntable oven wherein the turntable rotates one revolution in the time needed to bake an unbaked pie to completion.

Fresh pies are placed onto the turntable in the baking chamber at the predetermined temperature to be baked for a fraction of one revolution or turn or to be baked to completion for a full revolution. Partially baked pies are removed from the turntable and stored in a holding chamber under controlled temperature and humidity. Said humidity is regulated by instant steam injection, preferably with fan circulation. At peak demand, stored pies are returned to the turntable to be baked for the remaining fraction of a revolution.

The invention will now be more fully described with specific reference to the accompanying drawings which illustrate a novel oven wherein the improved baking process of this invention in one particular embodiment is carried out. It is to be understood, the drawings are simple exemplifications of the idea of the invention, as many modifications of the invention are possible. The process of storing the precooked pies can be carried out in a separate chamber outside the oven if so desired.

BRIEF DESCRIPTION OF THE DRAWINGS

FIG. 4 shows the tray supporter connected to the rotatable shaft.
FIG. 5 is a detailed view of a single tray.

DETAILED DESCRIPTION OF THE INVENTION

Figure 1:
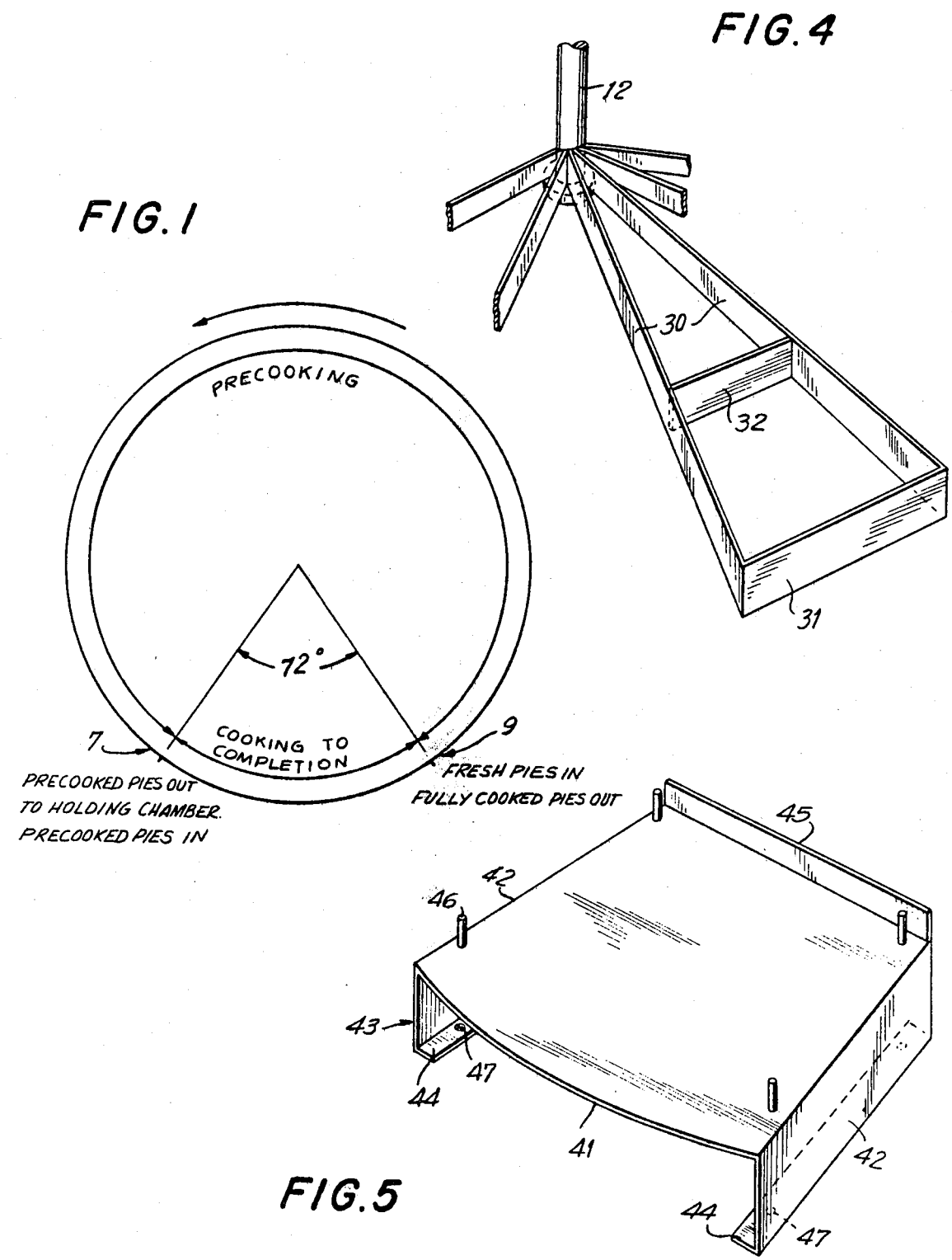
FIG. 1 shows the flow of pizza during cooking

In accordance with one aspect of the present invention, the baking process is carried out in a step-wise manner. The fresh pies are prebaked for a predetermined time, about four-fifths of the total baking time at a preselected temperature. The prebaked pies are then stored in a holding chamber under controlled temperature and humidity such that the prebaked pies stay warm and moist.

The storing conditions are the key factors in preserving the quality of the final product. Conventional methods for preserving moisture for the baked food product by either freezing or supplementing the lost moisture by slow evaporation of water are defective and inadequate.

In the claimed invention, the holding chamber for the prebaked pies is controlled at a temperature, such that the prebaked pies need the least amount of time in the final baking. More importantly, the humidity within the chamber is maintained at a desired level all the time which is of vital importance to preserve the quality of the stored pies. As the door to the holding chamber is frequently being opened for access to the stored pies or to store pies, the humidity immediately falls. In accordance to the invention, a humidity meter is set at a predetermined setting in the range of about 40–70%, a preferably 50–60% and at a temperature of about 140°–200° F. When the humidity falls below the setting, the humidity meter triggers a steam generator to generate steam. The steam is injected into the chamber via a tube connected to the steam generator. The steam is then circulated by a fan; thus the humidity is corrected to the desired level within seconds. As the humidity reaches the desired setting, the humidity meter signals the mechanism to shut off the steam generating. The described controlled conditions at which prebaked pies are stored, serve two purposes. First, the stored pies are at relatively high temperatures; therefore, they need minimum final baking time. Second, the stored pies having adequate moisture, when finally baked at intense heat, turn to golden brown on the outside and yet are moist inside without losing excessive moisture. The final baking takes about one-fifth of the total baking time under an intense heat which is at a higher temperature than the prebaking. The step-wise baking does not have to be limited to any particular oven.

In accordance with a preferred embodiment of this invention, the step-wise baking and storing are carried out in one oven, namely the turntable oven as hereinafter described and can be operated by an unskilled operator.

For the understanding of the baking process, it is necessary to briefly refer to the structure of the oven. The oven best suited for the baking process of this invention comprises an upper holding chamber and a lower baking chamber separated by a top wall of the baking chamber. In the baking chamber, a turntable is rigidly fixed on the upper end of a first rotating shaft, thereby providing an unobstructed baking surface. The turntable rotates constantly at a speed such that it turns one revolution in the time needed to cook an unbaked pizza pie to completion. In the holding chamber, there is provided a holding table which is fixed at the center to the lower end of a second rotating shaft. Burners under the turntable in the baking chamber provide hot gas for baking.

A portion of the hot gas rises from the baking chamber through a central opening of the top wall of the baking chamber thereby supplying heat to the holding chamber. A plurality of vertically spaced trays which can be stacked on one another are arranged on the periphery of the holding table for storing pies. The table is operated by an electric switch to turn in either direction so as to move any desired stack of trays to a door.

Fresh pies are placed onto the turntable in the baking chamber and may be baked to completion as they travel one revolution or turn on the turntable.

Partially cooked pies may be removed from the turntable in the baking chamber after they have travelled a predetermined fraction of a revolution, stored in the holding chamber, and later returned to the baking chamber to be cooked to completion as they travel the remainder of a full revolution on the turntable, under a row of electrical heating elements.

The improved baking process according to a preferred embodiment is described with reference to FIG. 1 to illustrate the principle of the baking process. FIG. 1 shows a plan view of the turntable in the baking chamber and the flow of pizza pies through the oven during operation. Referring to FIG. 1, fresh pies are loaded onto the constantly rotating turntable at 9, the main door. The turntable rotates counter-clockwise as shown by the arrow, at a rate of about one revolution per ten minutes. The pies travel on the turntable for example, for four-fifths of a full revolution, in about eight minutes, the time needed to precook the pies at a selected temperature commensurate to the time of cooking. At time of peak demand, the pies are left in the baking chamber for a final fifth revolution on the turntable, for about two more minutes, and returned to the main door, 9, at which time the pies are fully cooked and removed from the oven to be served. At times when the demand for pizza pies is slow, precooked pies are removed from the baking chamber at 7, the second door, and placed in a holding chamber to be kept warm. (not shown in FIG. 1) At times of peak demand, precooked pies in the holding chamber may be returned to the baking chamber at 7 to travel on the turntable for cooking to completion in approximately two minutes. The fully cooked pies are removed from the baking chamber at the main door 9.

The invention is now described in terms of the structure of the oven for the understanding of the baking process. Referrring to FIGS. 2 and 3, the improved turntable oven according to a preferred embodiment comprises a lower baking chamber 5 having a housing defined by a lower cylindrical wall 4, and a bottom 3; and an upper holding chamber 6 having a housing defined by an upper cylindrical wall 1 and a flat roof 2. The two chambers are separated by a horizontal top wall 11 which defines a roof for the baking chamber. The top wall 11, has a central opening 18 which provides fluid communication between the two chambers.

In the baking chamber, there is provided a horizontal circular turntable 14, supported by an angle iron 17, rigidly fixed at its center, on the underside, to the upper end of a vertical rotatable shaft 15 in such a way that the turntable baking surface is unobstructed. The turntable 14 is driven by an electric variable speed motor with a gear speed reducer and chain drive generally indicated as 16.

In accordance with the preferred embodiment of this invention, the baking time is preset by the speed at which the turntable rotates, such as once in about ten minutes, the time needed to bake the pies to completion at preselected varying temperatures. As described hereinafter, the final baking is carried out at a higher temperature than the prebaking.

It is to be noted that the temperature in the baking chamber should be sufficiently high to bake the pies to completion at the selected time for the turntable to make one revolution. Therefore, the time of cooking, i.e., the time for one revolution of the turntable and the temperature and the pie thickness are all interrelated; a temperature between 400° and 600° F. will be sufficient to bake the pies of about ½" thickness in ten minutes. These examples are for illustration only. The baking time can be varied in accordance with the baking temperature and is not limited to ten minutes. It is to be noted that the final baking is carried out at higher temperature than the initial cooking, such that the pies will turn golden brown at the end of the final baking. If desired, the final baking can be carried out in a separate heater providing sufficient high temperatures for browning. These baking conditions are known to those skilled in the art, and no further details in this respect are deemed necessary for a complete understanding of the invention. It is to be understood that the words baking and cooking are used herein interchangeably throughout.

In the holding chamber 6, there is provided a holding table 10 of approximately the same diameter as the turntable. It is rigidly fixed at the center of the upper side of the table to the lower end of a second rotatable shaft 12. The second shaft 12 is driven by a similar drive assembly 13 as the one used for driving shaft 15 in the baking chamber. This assembly 13 is preferably located above the roof 2. The holding table 10 is operated by an electric switch 27 located on an instrument and control panel 50 which is fixed on the outside of the cylindrical walls 1 and 4. The holding table can be rotated in either direction so that any part of the table can be moved opposite a door 8.

Figure 2:
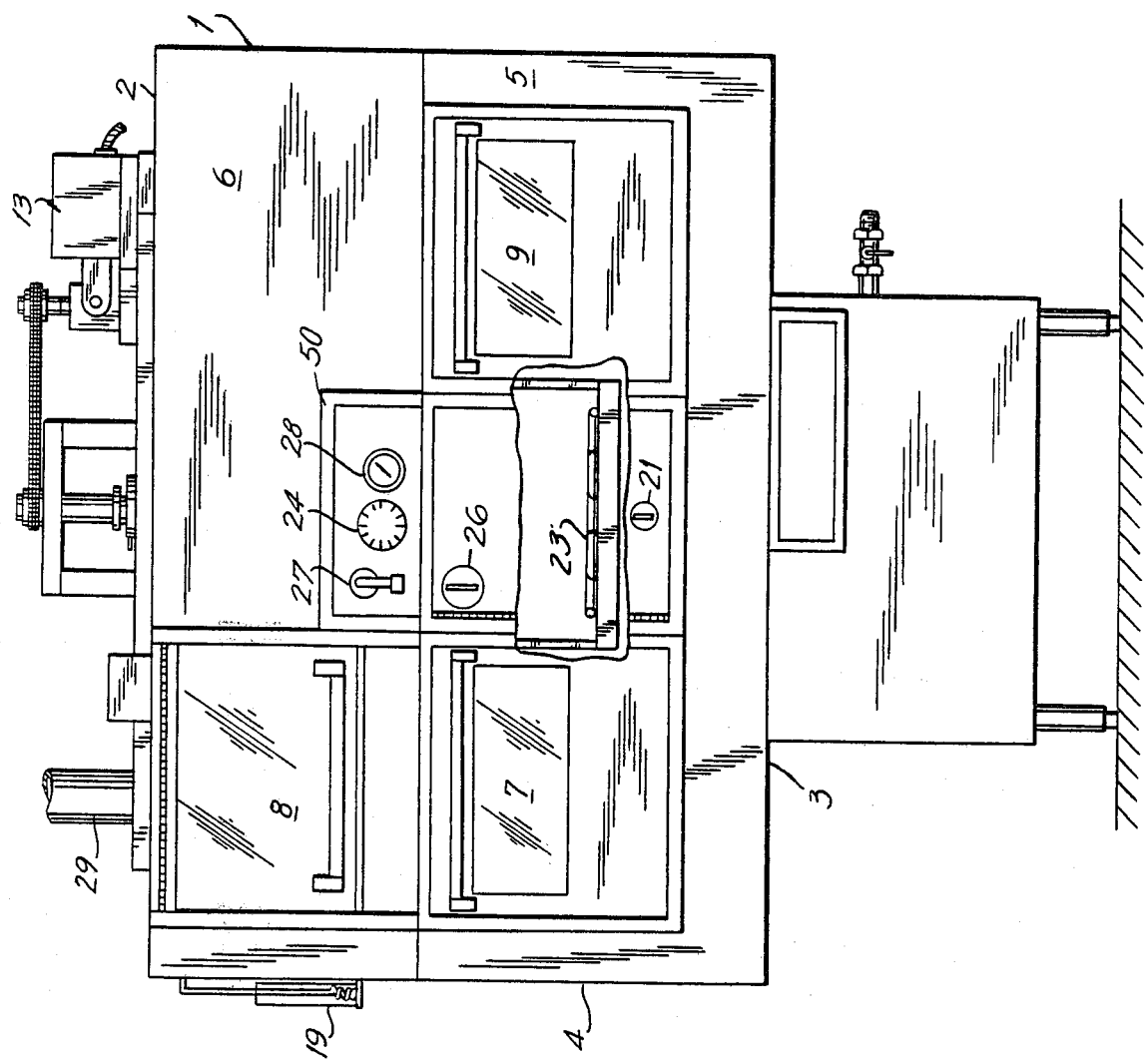
FIG. 2 shows the front view of the oven.
Figure 3:
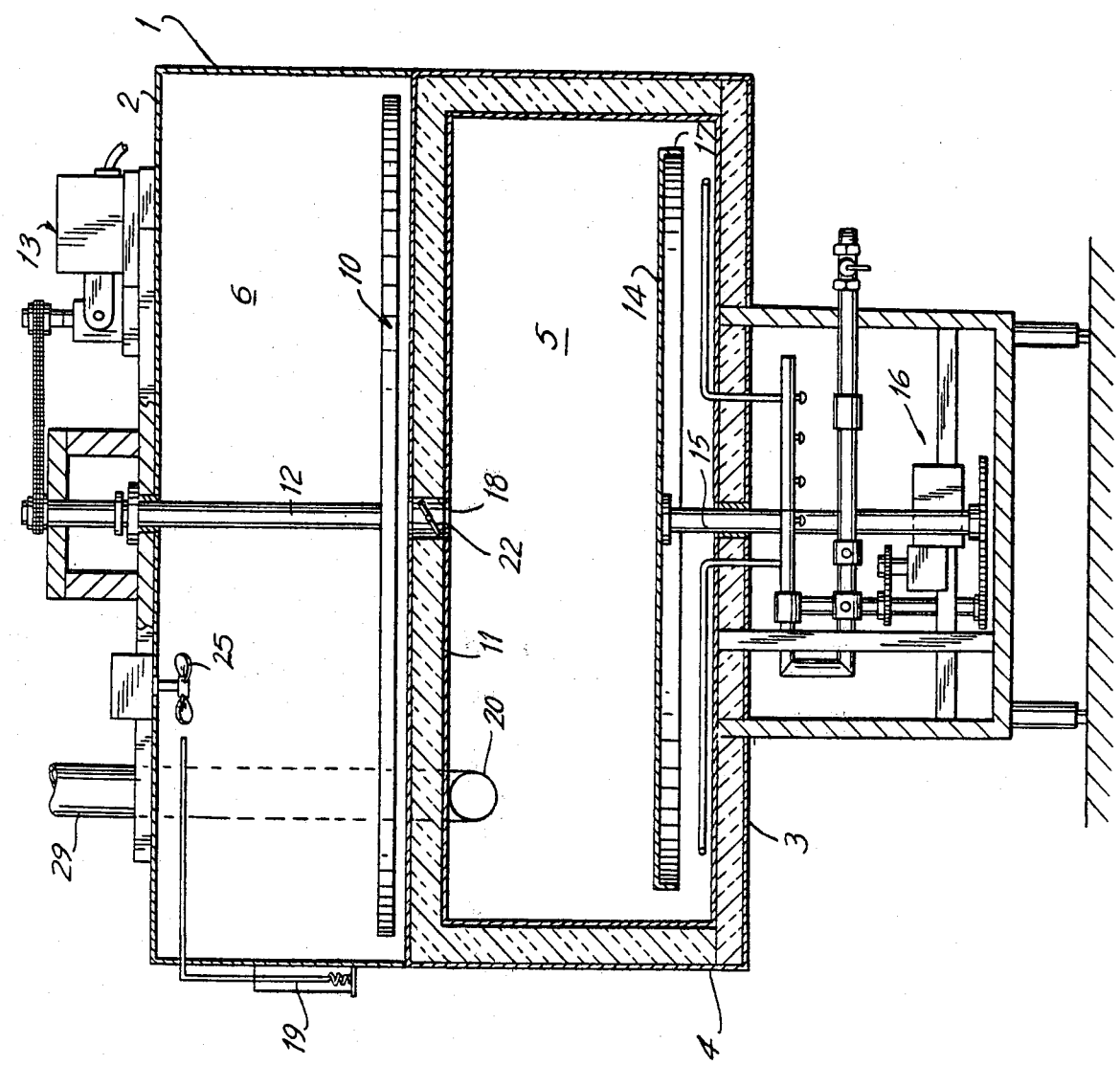
FIG. 3 is a crossectional view of the oven.

Referring to FIG. 2, at the right of panel 50, a main door 9 is provided on wall 4 of the baking chamber for loading unbaked pies and also for unloading fully baked pies. A second door 7 is located on the left of the panel 50. The second door is located at such a position that the longer distance between the doors 7 and 9 travelled by the turntable provides sufficient time for precooking fresh pies, and the remaining shorter distance between the doors 7 and 9 travelled by the turntable provides sufficient time for final baking of the precooked pies. In accordance with a preferred embodiment, the shorter distance between the doors 7 and 9 corresponds to at most one-fifth of a revolution of the turntable. A third door 8 is located in the holding chamber directly above the second door 7 for convenient transfer of pies between the two chambers.

It is to be understood that the separation between the doors 7 and 9 and the speed of the turntable are selected so as to provide the best precooking and finishing time for the type of pies which is popular among the patrons of the pizzeria.

The positions of the doors have been described for counterclockwise rotation of the turntable; they would be reversed for clockwise rotation of the turntable.

On the upper side of the holding table 10, there is provided a tray support structure as shown in FIG. 4. A plurality of spoke-like metal strips 30 radiates from the shaft 12 forming sectors each having an outer arc of about 16". Cross bracing members 31 and 32 connecting the adjacent spokes form a rigid lattice frame for supporting trays to be described hereinbelow.

About four trays may be stacked on top of one another. The trays are easy to clean and assemble. Each stack of trays can be taken out as a unit. FIG. 5 shows such a tray.

As shown in FIG. 2, on the instrument and control panel 50, there is provided a thermostat 28 for control of the temperature in the holding chamber. The thermostat in connection with a relay and solenoid actuates a butterfly valve 22 shown in FIG. 3, pivotally mounted in an opening 18 on the top wall 11 of the baking chamber, through which opening the two chambers are in fluid communication. Thus the temperature of the holding chamber is regulated in that when the temperature varies from the preset reading, the butterfly valve will close or shut the gas flow from the baking chamber. Switch 27 as described hereinabove is for turning the holding table 10 in either direction for ease of access to the pies stored on trays. In addition, a humidity meter 24 for monitoring the humidity of the holding chamber is provided. Humidity must be maintained so that the pies will not dry out during storage in the holding chamber. The humidity meter signal is amplified and transmitted to operate steam generator 19, located outside the holding chamber to supply steam to the holding chamber. The steam is introduced through a tube in the vicinity of a fan 25 supported from the roof for distributing steam throughout the chamber. The fan further circulates warm air to maintain uniform temperature and humidity throughout the chamber.

For the sake of keeping precooked pies warm in storage and without loss of moisture as not to cause the pies to become dry and hard, the humidity in the holding chamber is maintained constant in the range of about 40% to 70% preferably 50%–60% at a temperature range of about 140° F. to 200° F. The humidity in the holding chamber will drop when the door to the holding chamber is being opened. This triggers the humidity control signal and causes the steam generator to inject steam into the holding chamber. As soon as the humidity reaches the setting of the humidity controller, the signal shuts off the steam generator. With the aid of the fan, the humidity of the air equalizes rapidly. This method of humidity control gives quick response to moisture loss. Any slow response to correct the humidity during the storing period, such as in the conventional method of providing a pan of water, will not be able to correct the loss of humidity as quickly as provided in this invention. Consequently, the stored pies under the conventional method would tend to dry out when the door is opened. It should be apparent that the control of the conditions in which the precooked pies are stored is of paramount importance. The advantages of the baking process of this invention are that the precooked pies can be stored under the controlled temperature and balanced humidity for a long period of time without adverse effect on the quality of the pies. This is so because the precooked pies are held at relatively high temperatures and humidity to prevent spoilage and loss of moisture and most important, to shorten the browning time in the final baking stage to a minimum. Therefore, this improved process overcomes the problem of loss of moisture both during the storage and final browning of the precooked pies.

It is to be noted that the above described cooking arrangement is most efficient and economical. However, the holding chamber does not have to be within the oven. It can be a separate unit located adjacent of the oven, with the same temperature and humidity control.

In the final baking section, a thermostat 21 for controlling the temperature of a heating element, and an electric coil 23 suspended above the turntable behind the panel. The heating element, 23 provides intense cooking of precooked pies to completion at a temperature higher than the prebaking, generally around 600° F. The heating element may be affixed on the wall 4 and supported from top wall 11, extending horizontally from the wall to the center of and above the turntable. Pies passing under the heating elements are cooked to completion in about two minutes or less while travelling from the second door 7 to the main door 9. Thus the pies baked under the intense heat will be golden brown with minimum loss of moisture.

In operation, fresh pies placed on the turntable at main door 9 can be removed from the second door 7 and stored in holding chamber at third door 8, for later use or the precooked pies can be left on the turntable for cooking to completion and returned to the main door.

For example, with a turntable of 60" diameter constantly turning at a rate of one revolution per ten minutes or about 18" per minute at the periphery, an operator will have ample time after loading unbaked pies at the main door 9 to prepare the next pie or to remove precooked pie at the second door 7 and to set it on the tray in the holding chamber or to transfer pies from the holding chamber at the third door 8 to the baking chamber at the second door 7 and then remove fully cooked pie at the main door 9. The operator merely recovers pies as they arrive at the main door or the second door without having to inspect the pies to see whether they are done. This is possible only because the cooking time has been carefully correlated with the temperature of the baking and with the size of the pies. This eliminates any guess work by the operator and ensures uniform quality and simplified operation.

Numerous modification and variations of the present invention are possible in light of the above teaching and therefore, the invention may be otherwise than as particularly described.

I claim:
1. A process for baking pies for quick serving in a turntable oven having a constantly rotating turntable, rotating at a speed of one revolution in the time to complete the baking of a fresh pie comprising:
   (a) placing fresh pies on the turntable;
   (b) prebaking said pies at a temperature from about 400° F. to 600° F. for about four-fifths of a revolution;

(c) removing the partially baked pies from the turntable;

(d) storing the partially baked pies in a holding chamber maintained at a temperature of from about 140° F. to 200° F. and a humidity of from about 40% to 70%, said humidity being controlled by instant steam injection and shut off in response to a humidity meter monitoring the same;

(e) replacing said stored pies onto the turntable and subjecting the pies to intense heat baking for the remaining about one-fifth of a revolution; and (f) removing the fully baked pies for serving.

2. A process for baking pies of claim 1, wherein the holding chamber is within the turntable oven.

3. A process for baking pies in a turntable oven having a constantly rotating turntable for baking, rotating at a speed of one revolution in the time to complete the baking of fresh pies, a first door and a second door thereon for access to the turntable, the longer distance between the first and second door corresponding to about four-fifths of a revolution of the turntable, comprising:

(a) placing fresh pies on the turntable at the first door for prebaking at a preselected temperature for about four-fifths of a revolution of the turntable to produce precooked pies;

(b) removing precooked pies at the second door;

(c) storing said pies from step b in a holding chamber under a controlled temperature and humidity;

(d) replacing stored pies on the turntable at the second door for final baking under intense heat for the remaining about one-fifths of a revolution of the turntable to produce fully cooked pies and (e) removing fully cooked pies at the first door.

4. A process of claim 3 wherein the preselected temperature is from 400° F. to 600° F.

5. A process of claim 3 wherein the humidity is controlled by steam injection and the controlled temperature is from 140° F. to about 200° F. and the controlled humidity is from about 40% to about 70%.

6. A process of claim 3 wherein the holding chamber is within the oven.

7. A process of claim 6 wherein a door to the holding chamber is located directly above the second door.

8. An improved process for baking pies comprising (a) prebaking fresh pies in a turntable oven having a constantly rotating turntable for baking, said turntable rotating at a speed of one revolution in the time to bake the fresh pies to completion, for about four-fifths of a revolution at a preselected temperature;

(b) storing prebaked pies under a controlled temperature and humidity;

(c) finally baking the stored pies for the remaining one-fifths of a revolution.

9. An improved process of claim 8 wherein the humidity is controlled by steam injection.

10. An improved process of claim 8 wherein the controlled humidity is from about 40% to about 70% and the controlled temperature is from about 140° F. to about 200° F.

11. An improved process of claim 9 wherein injected steam is further circulated by a fan.

12. The process of claim 8 wherein the final baking is under intense heat.

* * * * *